United States Patent
Will et al.

(10) Patent No.: US 9,009,756 B2
(45) Date of Patent: Apr. 14, 2015

(54) VIRTUAL CHANNEL MAP MASKING

(75) Inventors: Douglas Will, Parker, CO (US); Kenneth Troy, Southampton, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 352 days.

(21) Appl. No.: 13/086,013

(22) Filed: Apr. 13, 2011

(65) Prior Publication Data
US 2012/0266204 A1 Oct. 18, 2012

(51) Int. Cl.
*H04N 7/10* (2006.01)
*H04N 5/445* (2011.01)
*H04N 5/50* (2006.01)
*H04N 21/2362* (2011.01)
*H04N 21/2668* (2011.01)

(52) U.S. Cl.
CPC ....... *H04N 21/2362* (2013.01); *H04N 21/2668* (2013.01)

(58) Field of Classification Search
CPC ............ H04N 21/462; H04N 21/4623; H04N 21/4627; H04N 21/258; H04N 21/25808; H04N 21/25816
USPC ................. 725/37, 38, 56; 348/731
See application file for complete search history.

(56) References Cited

U.S. PATENT DOCUMENTS

| | | | |
|---|---|---|---|
| 4,009,343 A * | 2/1977 | Markey et al. | 370/321 |
| 4,792,973 A * | 12/1988 | Gilhousen et al. | 380/231 |
| 5,400,401 A | 3/1995 | Wasilewski et al. | |
| 5,420,866 A | 5/1995 | Wasilewski | |
| 5,978,649 A * | 11/1999 | Kahn | 725/25 |
| 6,160,545 A | 12/2000 | Eyer et al. | |
| 6,317,881 B1 * | 11/2001 | Shah-Nazaroff et al. | 725/24 |
| 6,661,472 B2 | 12/2003 | Shintani et al. | |
| 6,751,713 B1 | 6/2004 | Guo | |
| 6,775,843 B1 | 8/2004 | McDermott | |
| 6,792,616 B1 | 9/2004 | Jerding | |
| 6,871,355 B1 | 3/2005 | Hashimoto | |
| 6,937,611 B1 | 8/2005 | Ward | |
| 7,469,415 B2 | 12/2008 | Kim et al. | |
| 7,818,578 B2 * | 10/2010 | Lewis et al. | 713/176 |
| 8,050,406 B2 * | 11/2011 | Pedlow, Jr. | 380/277 |
| 8,165,302 B2 * | 4/2012 | Pedlow, Jr. | 380/277 |
| 2001/0014976 A1 * | 8/2001 | Roop et al. | 725/91 |
| 2002/0194476 A1 * | 12/2002 | Lewis et al. | 713/169 |
| 2003/0088872 A1 * | 5/2003 | Maissel et al. | 725/46 |
| 2006/0107057 A1 * | 5/2006 | Lewis et al. | 713/176 |
| 2006/0107058 A1 * | 5/2006 | Lewis et al. | 713/176 |
| 2006/0274898 A1 * | 12/2006 | Pedlow, Jr. | 380/277 |
| 2007/0220557 A1 | 9/2007 | Lee et al. | |
| 2007/0242829 A1 * | 10/2007 | Pedlow, Jr. | 380/277 |
| 2010/0100909 A1 * | 4/2010 | Arsenault et al. | 725/70 |
| 2011/0103497 A1 * | 5/2011 | Wilhelmsson et al. | 375/260 |
| 2012/0011541 A1 * | 1/2012 | McCarthy | 725/35 |

* cited by examiner

*Primary Examiner* — James R Sheleheda
(74) *Attorney, Agent, or Firm* — Banner & Witcoff, Ltd.

(57) ABSTRACT

Aspects of the disclosure relate to methods and systems for adding or removing virtual channels from a terminal. A controller may send a virtual channel map to one or more terminals. The controller may also send a bitmask to one or more terminals. Each bit of the bitmask may indicate whether a virtual channel should be ignored. The channels that a terminal is permitted to receive may be altered by updating the bitmask.

20 Claims, 4 Drawing Sheets

Method of Generating/Modifying a Bitmask

| | Operation Performed | Virtual Channel 0 | Virtual Channel 1 | Virtual Channel 2 | Virtual Channel 3 | Virtual Channel 4 | Virtual Channel 5 | Virtual Channel 6 | Virtual Channel 7 | Virtual Channel 8 | Virtual Channel 9 |
|---|---|---|---|---|---|---|---|---|---|---|---|
| 301 | Mask Allowing No Channels | 0 | 0 | 0 | 0 | 0 | 0 | 0 | 0 | 0 | 0 |
| 302 | Mask Allowing Channels 2-4 | 0 | 0 | 1 | 1 | 1 | 0 | 0 | 0 | 0 | 0 |
| 303 | Result of Logic OR | 0 | 0 | 1 | 1 | 1 | 0 | 0 | 0 | 0 | 0 |
| 304 | Mask Allowing Channels 7, 9 | 0 | 0 | 0 | 0 | 0 | 0 | 0 | 1 | 0 | 1 |
| 305 | Result of Logic OR | 0 | 0 | 1 | 1 | 1 | 0 | 0 | 1 | 0 | 1 |
| 306 | Mask Permitting Channels 2, 4-8 | 0 | 0 | 1 | 0 | 1 | 1 | 1 | 1 | 1 | 0 |
| 307 | Result of Logic AND | 0 | 0 | 1 | 0 | 1 | 0 | 0 | 1 | 0 | 0 |

Fig. 3

VIRTUAL CHANNEL MAP MASKING

BACKGROUND

Content distributors, such as television providers, often organize the content they distribute into virtual channels. A virtual channel provides a user with an easy way of identifying a particular content source. The virtual channel need not bear any relation to the resources on which the content source is delivered. For example, virtual television channels are often given numeric designations, such as "channel 24." But "channel 24," depending on the distribution technology at hand, may be transmitted or received on any physical channel and/or on any port. A virtual channel map may correlate the virtual channel with the resources on which the virtual channel is received.

Content distributors often provide subscribers or other users with a variety of options for receiving a variety of content. The fees charged by the content distributors may vary depending on the options selected, for example. Thus, it is often desirable to limit access to certain virtual channels to only those who have paid an appropriate fee or are otherwise granted permission to receive the virtual channels. An improved system and method are desirable to control access to virtual channels.

SUMMARY

Some aspects of the disclosure relate to methods and systems for adding or removing virtual channels from a terminal. In one aspect, a controller may send to one or more terminals a mapping of virtual channels to resources. Examples of resources include ports, physical channels, and physical sub-channels. The ports, physical channels and/or physical sub-channels may be accessed in order to receive the content associated with one or more virtual channels. Other examples of resources include stream identifiers, access codes, and other information that facilitates access to content. The virtual channels in the mapping may exceed the virtual channels that any one terminal is permitted to provide.

A controller may also send a bitmask to one or more terminals. Each bit of the bitmask may indicate whether a virtual channel should be ignored or otherwise disabled by a terminal. A terminal may generate a new virtual channel map that excludes the virtual channels that are to be ignored; it may alter the virtual channel map in another way; or it may ignore the virtual channels indicated by the bitmask without altering the virtual channel map. A terminal may exclude the ignored virtual channels from an electronic programming guide, or it may include information about such channels in an electronic programming guide listing.

According to another aspect of the disclosure, each terminal on a network may receive an individually addressed message containing a bitmask. Thus, the channels that are to be ignored may not be the same across terminals. The bitmask for a particular terminal may be updated in response to a user request. The user request may be made via a terminal, via a web interface, or via a customer service representative or other person, device, or entity that can directly or indirectly route messages to a controller.

According to another aspect of the disclosure, updates to a bitmask may take the form of an entire new bitmask, but they may also be formatted as a message that contains only an updated portion of the bitmask. A bitmask for a terminal may be updated by combining it with another bitmask using bit-wise logical operators. A controller can transmit bitmask updates to a terminal. It may do so in response to a received message, on a schedule, or upon the occurrence of an event, such as the end of a particular piece of content. A terminal may also update its own bitmask in response to user input, in response to instructions from a controller, on a schedule, or upon the occurrence of an event. Updates to the bitmask may occur when a new virtual channel is offered or when a virtual channel is moved or removed. Updates may also occur when a user changes the virtual channels he desires to receive or when a user is granted temporary access, such as a day pass, to a virtual channel.

The preceding presents a simplified summary in order to provide a basic understanding of some aspects of the disclosure. The summary is not an extensive overview of the disclosure. It is neither intended to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

The present disclosure is illustrated by way of example and is not limited in the accompanying figures.

FIG. 3 shows an illustrative example of a method that may be used to generate and/or modify a bitmask.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

A virtual channel provides a user with an easy way of identifying a particular content source. For example, one or more textual (e.g. "WXYZ") and/or numeric (e.g. "channel 12") identifiers may be associated with a content source. The resources through which the underlying content source is accessed may be of any type. A content source may be accessed via a physical channel, sub-channel, or combination of channels and/or sub-channels in, for example, a radio-frequency distribution system, such as a system involving over-the-air and/or coaxial cable transmissions. A content source may also be accessed, for example, via a physical and/or logical port. Virtual channel maps can be implemented in any type of system, including systems that utilize more than one technology for delivering content. For example, some virtual channels may be associated with analog signals while other virtual channels may be associated with digital network locations.

Figure 1:
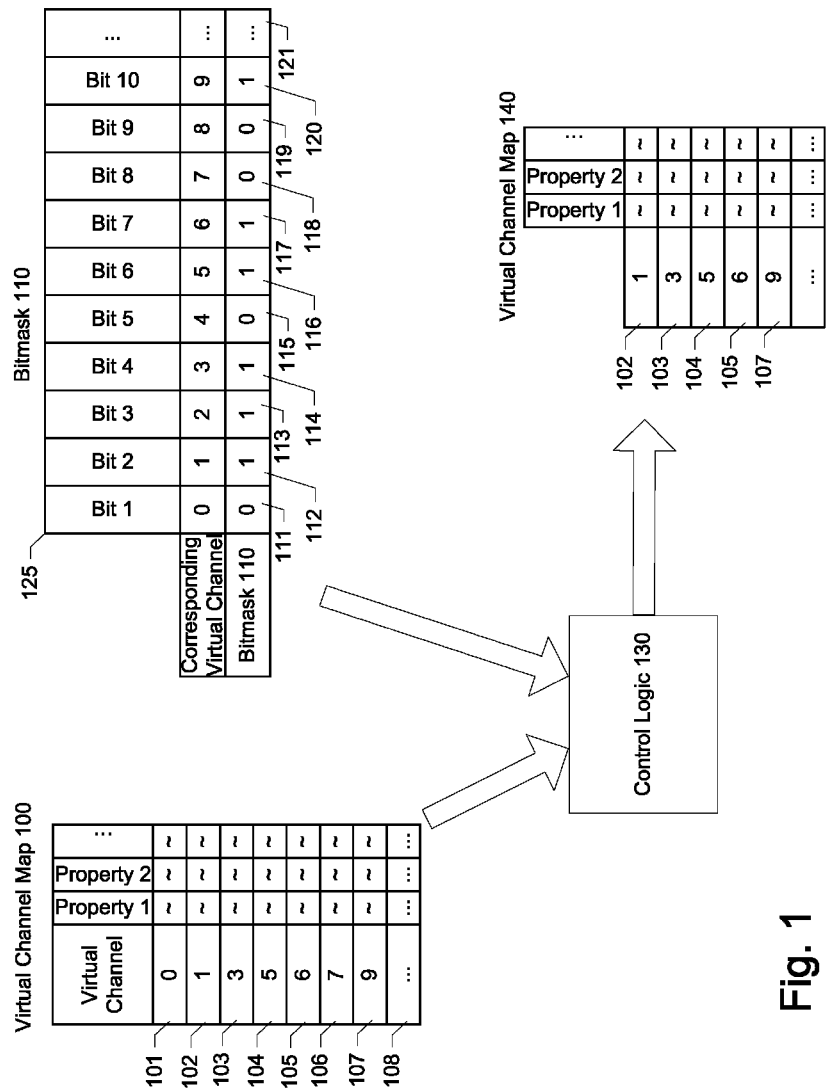
FIG. 1 illustrates an example virtual channel map, an example bitmask, and an example of how control logic may use the bitmask to modify the virtual channel map.

FIG. 1 illustrates an example of a virtual channel map, an example of a bitmask, and an example of how control logic may use the bitmask to modify the virtual channel map. Virtual channel map 100 contains a series of virtual channels 101-108. The ellipses in row 108 indicate that a variety of other virtual channels may be included in virtual channel map 100 in addition to those shown in rows 101-107. Virtual channel map 100 associates each virtual channel listed in the map with one or more properties of those virtual channels. Virtual channel map 100 may be received by a terminal, such as a display device. Virtual channel map 100 may be sent to the terminal automatically, or the terminal may request that the virtual channel map be sent.

The properties of virtual channels that may be contained within virtual channel map 100 may include identifiers of the resources that may be accessed in order to receive the content identified by the virtual channel. Examples of such resources may include, for example, a particular port, physical channel, and/or physical sub-channel. Further examples include access codes, stream identifiers, network locations, information about how the content is encrypted, information about how the content is modulated, etc. Other examples of properties that may be included in virtual channel map 100 include descriptions of the content itself For example, if the content is an audio and video feed, then an identifier of the feed, such as "HBO1," may be included as a property in the virtual channel map 100. Another property that may be included is an indication of whether a virtual channel is hidden. A hidden channel is one that a user may not tune to directly, but that is nonetheless available to be received through other means, such as through use of an interactive menu system. Although the virtual channel map 100 may contain much more information than the examples given above, it may also contain relatively little information, and none of the examples given above are required to be present.

Although depicted as a table in FIG. 1, the virtual channel map may be in any format. For example, the virtual channel map may contain tables within tables or pointers to other tables, and it may have a linked list or tree structure. The number of properties associated with any one virtual channel may differ from the number of proprieties associated with any other virtual channel, and a variety of other variations are also possible. An example of a format for a virtual channel map can be found in the Society of Cable Telecommunications Engineer's Standard Number 65 (SCTE 65).

A terminal may allow a user to access the content of one or more virtual channels. For example, if the content associated with a virtual channel is an audio stream, the terminal may output the audio stream in a useable format, such as via speakers, analog or digital audio connectors, a data bus, or another data connection. If the content is a video stream, the terminal may output the stream via a display device, analog or digital connectors for a display device, a data bus, or another data connection. Similar examples exist in the case of other data streams, including computer applications, interactive video programs, etc.

A terminal may not provide access to the content associated with every virtual channel in virtual channel map 100. For example, a terminal may restrict access to certain virtual channels in accordance with bitmask 110, which may also be received by the terminal. Like the virtual channel map, bitmask 110 may be sent to the terminal automatically, or the terminal may request that the bitmask be sent.

The bits of bitmask 110 indicate whether (or not) a virtual channel should be ignored or otherwise not accessed by a terminal. If a virtual channel is to be ignored, then the terminal may not allow or prohibit access to that virtual channel, and the terminal may behave as though that virtual channel does not exist in the virtual channel map. As shown in table 125, each bit of bitmask 110 corresponds to a virtual channel. In this example, a "0" indicates that the corresponding virtual channel should be ignored, and a "1" indicates that the corresponding virtual channel should not be ignored. In other embodiments, the meanings of "1" and "0" may be reversed.

A terminal may restrict access to the virtual channels indicated by bitmask 110 by consulting the bitmask 110 prior to attempting to access a virtual channel. Alternatively, a terminal may incorporate the information contained in bitmask 110 into a virtual channel map. For example, the terminal may add a property to virtual channel map 100 that indicates whether the virtual channel should be ignored. With the information from bitmask 110 incorporated into the virtual channel map, the control logic of the terminal may consult only the virtual channel map to determine whether a virtual channel should be ignored. The control logic of a terminal may include a processor and an associated memory containing processor-executable instructions, a field programmable gate array (FPGA), or the like. Further examples of the hardware and/or software that may make up a terminal are discussed with reference to FIG. 4, below.

FIG. 1 illustrates an example of another way of incorporating the information contained in bitmask 110 into a virtual channel map. In this example, control logic 130 removes the entries of virtual channel map 100 that relate to channels that should be ignored. This may result, for example, in virtual channel map 140. As seen in FIG. 1, bits 111, 115, 118, and 119 of bitmask 110 respectively indicate that virtual channels 0, 4, 7, and 8 should be ignored. Conversely, bits 112-114, 116-117, and 120 respectively indicate that virtual channels 1-3, 5-6, and 9 should not be ignored. As a result, the entries for virtual channels 0 and 7 (entries 101 and 106) have been removed from virtual channel map 140. Note that there was no entry for channels 4 or 8 in virtual channel map 100, so there was nothing to remove. If such entries were present in the example above, they would have been removed as well. Similarly, there was no entry for channel 2 in virtual channel map 100, so there was no entry to carry forward into channel map 140.

As the process of generating virtual channel map 140 illustrates, a bit in bitmask 110 may not have any meaning if it corresponds to a virtual channel that is not contained in the virtual channel map. Consequently, alternative formats of bitmask 110 may omit such bits from the bitmask. In one example of an alternative format, the first bit of the bitmask corresponds to the virtual channel referenced in the first entry of the virtual channel map, the second bit in bitmask 110 corresponds to the virtual channel referenced in the second entry of the virtual channel map, etc. In another example of an alternative format for the bitmask, each bit of the bitmask may correspond to the next lowest virtual channel in the channel map. This alternative differs from the previous example if the entries of the virtual channel map are not saved in order from lowest to highest. A variety of other examples of how to format bitmask 110 also exist, such as reversing the order of the bits in each of the examples given above.

A terminal may operate as if the channels that the bitmask indicates should be ignored do not exist at all. For example, a terminal may use virtual channel map 140 exclusively. But even if virtual channel map 140 is used for program access, virtual channel map 100 may be used for an electronic program guide, for example. By using virtual channel map 100 to implement the electronic program guide, the electronic program guide may include the virtual channels that bitmask 110 indicates the terminal should ignore in the program guide listing. This allows the guide to display all of the content available from the content provider, not just the content that the terminal may access.

Alternatively, a terminal may use virtual channel map 140 to implement an electronic program guide. By using this virtual channel map, the electronic program guide excludes from the program guide listing the virtual channels that bitmask 110 indicates the terminal should ignore. This avoids tempting a user to select a virtual channel that is not available to the user. An electronic program guide may also be implemented using an alternative virtual channel map or using a data source other than a virtual channel map.

Updated versions of bitmask 110 may be received by a terminal periodically; when changes to the bitmask occur or may occur; upon a request from the terminal; and/or upon the occurrence of another event, such as when the terminal boots, first connects to a network, and/or detects an actual or potential error in the bitmask.

There is no requirement that a virtual channel map be updated at the same time as the bitmask. The bitmask may be updated when the set of virtual channels that a terminal is permitted to access changes. This may occur even when the virtual channel map remains unchanged. For example, the virtual channels transmitted on a terminal on one or more networks may remain unchanged, but an updated bitmask may permit the terminal to access more of the virtual channels due to, for example, a promotion, because a user associated with the terminal purchased or was authorized to receive a more comprehensive content package, or because a user associated with the terminal removed access restrictions such as parental controls from the terminal. Because access to each virtual channel can be set individually in the bitmask, a terminal may be instructed to receive or ignore any combination of virtual channels by the bitmask.

An update to the bitmask may take the form of an entire new bitmask. It may also take the form of an update to only part of the bitmask. In this case, a terminal may receive a message indicating the first bit of the bitmask to be delivered, the number of bits being delivered, and finally the bits themselves. The terminal may then replace the appropriate bits of the bitmask with the newly-received bit field. If the terminal is configured to combine the bitmask with the virtual channel map, the terminal may perform and/or repeat the above described steps for combining a bitmask with a virtual channel map using the updated bitmask.

Receiving only a portion of the bitmask may be advantageous because it requires less bandwidth than receiving the entire bitmask. However, depending on the message format and the length of the bitmask, there may be no bandwidth savings from sending only a portion of the bitmask, or the space required to indicate where the updated bit field starts and stops may result in more bandwidth usage than sending the entire bitmask. Even if there is no bandwidth savings, updating only a portion of a bitmask may be advantageous. For example, if a new channel is made available to all terminals, a message updating the bit for that channel may be sent to all of the terminals. This message may be the same for all of the terminals because only the bit for the new channel is contained in the update. This may be simpler than sending an entire bitmask to the terminals because each terminal's bitmask may be unique. Thus, sending the entire bitmask may entail sending a message whose contents (the bitmask) may differ for each terminal.

Figure 2:
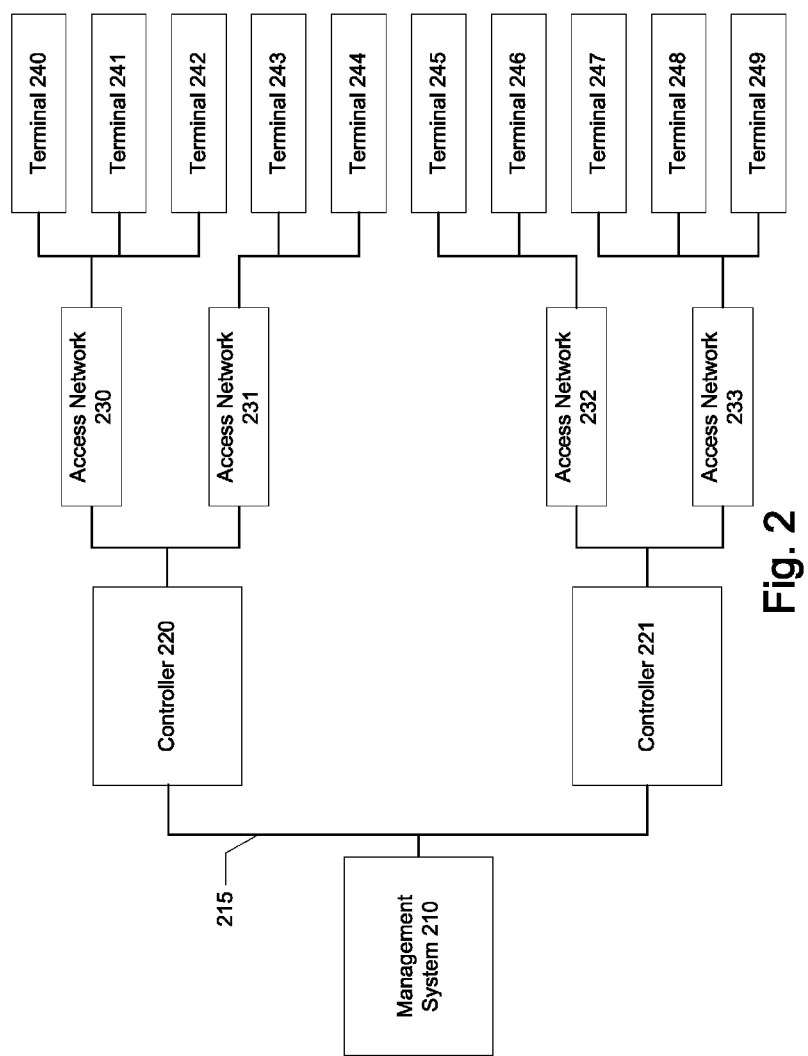
FIG. 2 shows an illustrative example of an information distribution network.

FIG. 2 shows an illustrative example of an information distribution network or a portion thereof. In this example, management system 210 communicates with controllers 220 and 221. This communication may occur over network or network portion 215. Management system 210 may instruct one or both of controllers 220 or 221 to add or remove a service offering from one or more terminals (240-249).

Controllers 220 and 221 may transmit one or more common virtual channel maps to each terminal on the access networks. Alternatively, each controller may transmit to each connected terminal one or more virtual channel maps that are distinct from the virtual channel maps transmitted by the other controllers. Further, each controller may transmit a plurality of virtual channel maps. For example, each access network (230-233) may use a different virtual channel map. Further, there may be a plurality of virtual channel maps made available on each access network. If multiple virtual channel maps are available to a terminal, the controller may indicate to the terminal which of the plurality of virtual channel maps to use. This map may differ across terminals. The terminals may have a predefined or default one of the multiple virtual channel maps to use, such as the first one. Where a default setting exists, the controller may indicate that another virtual channel map should be used to only some of the terminals, such as those terminals that should use a virtual channel map other than the default. Any protocol may be used to transmit the virtual channel maps, including, in some examples, the protocol specified in the Society of Cable Telecommunications Engineer's Standard Number 65 (SCTE 65).

A controller may also transmit bitmasks, such a bitmask 110, to each terminal. Each terminal may have a predefined or default bitmask. Where a default bitmask exists, a controller may transmit bitmasks to only some terminals, such as terminals whose bitmasks differ from the default. The bitmask may be unique for each of the terminals, or many or all of the bitmasks may be the same. The bitmasks may be transmitted, for example broadcast, to all of the terminals with an indication of which terminal each bitmask is intended for, or each bitmask may be uniquely addressed to each terminal. Alternatively, a multicasting technique may be used, such as addressing a message containing a single bitmask to multiple terminals that are each to use that bitmask. A separate message may be multicast to all or some of the terminals that are to use a different bitmask, and the process may be repeated until a bitmask has been sent to each terminal that is to receive a bitmask from the controller. (As mentioned above, in some cases a default bitmask may be used in lieu of one sent from a controller.) The bitmask may be sent as a whole, or it may be sent as an update to a previous bitmask. The very first transmission of a bitmask may still be sent as an update because the update may modify a default bitmask.

Divisions between access networks may be a purely logical construct. Alternatively, each access network may contain its own unique servers, routers, and other network nodes. Communications from the controller to one or more terminals may be forwarded directly to the terminals, but the message from the controller may also be delayed, cached and retransmitted, combined with other messages, translated, or otherwise modified by the nodes of the access network. The access networks may all use the same networking technology, but each access network may also use a different networking technology. Examples of networking technologies include passive optical networks, hybrid fiber/coax networks, coaxial cable networks, Ethernet networks, wireless networks, etc.

Although the example of FIG. 2 illustrates each terminal in only one access network, it is possible in other examples, such as where wireless networks are used, for the terminals to move between access networks or to exist in more than one access network at once. Similarly, although each component shown in the example of FIG. 2 is shown with one connection to each other component, more extensive interconnections are possible. The components shown in FIG. 2 are for illustrative purposes only. A greater or lesser number of each component may be present. For example, more or fewer of controllers may be present. Each controller may be connected to more or fewer access networks, and each access network may be connected to a greater or lesser number of terminals. Further, additional components may be present. Also, the functionality of various components may be combined into common hardware elements. For example, the management system and controllers may be implemented in a single server. Conversely, the functionality of various components may be split among one or more hardware elements. For example, a controller, such as controller 220, may include a plurality of individual servers. In other words, the functional block division as shown in FIG. 2 may either correspond to or be independent of the physical implementation of the functional blocks.

FIG. 3 shows an illustrative example of a method that may be used to generate and/or modify a bitmask. In this example, the bitmask contains ten bits, and each bit corresponds to one of ten virtual channels (labeled 0-9). In row 301, the process of generating a bitmask begins by loading a previous or default bitmask. In the example of FIG. 3, this is a bitmask that instructs a terminal to ignore all ten of the channels. Such a bitmask may be implemented if a terminal has been disabled from viewing all of the virtual channels, such as if a user has cancelled or not yet activated service on the terminal. This may also be a default bitmask.

In row 302, a second bitmask is shown. This bitmask grants access to channels 2-4. Such a bitmask may correspond, for example, to the lowest tier of service available. In row 303, channels 2-4 are added to the previous bitmask (shown in row 301) by combining the two bitmasks shown in rows 301 and 302 with a bitwise OR operation. The bitmask seen in row 303 may be transmitted to the appropriate terminals for use. In another example, bitmask 302 may be transmitted to the appropriate terminals, and the bitwise OR operation may be conducted at the terminals.

In the example of FIG. 3, the bitmask shown in row 303 is combined with the bitmask shown in row 304 using a bitwise OR operation to create the bitmask shown in row 305. The bitmask shown in row 304 allows access to channels 7 and 9. As discussed above, the bitmask shown in row 303 allows access to channels 2-4. The bitwise OR operation adds channels 7 and 9 to the previous bitmask (shown in row 303). Thus, the bitmask shown in row 305 allows access to channels 2-4 as well as access to channels 7 and 9. The addition of channels 7 and 9 to the bitmask shown in row 303 may occur immediately after the bitmask seen in row 303 is generated. Alternatively, this addition may occur at a later time, such a when a user upgrades his service from the previous level, which was represented by the bitmask seen in row 303.

In addition to adding channels with a bitwise OR operation, channels may also be subtracted by using a bitwise AND operation. For example, row 306 shows a bitmask permitting channels 2 and 4-8. If this bitmask and the previous bitmask were combined with a bitwise OR operation, channels 2 and 4-8 would be added to the previous bitmask. But, as seen in row 307, these channels are combined with the previous bitmask using a bitwise AND operation. The result is that any channels other than channels 2 and 4-8 that were previously permitted are no longer permitted. In this example, channels 3 and 9 have been removed from the previous bitmask (shown in row 305). The bitmask shown in row 306 may represent a list of channels that are considered child-friendly. If so, the result of the bitwise AND in row 307 is to remove all channels that are not considered child-friendly from the bitmask. Thus, the bitwise AND operation shown may be an example of applying parental controls to the terminal.

Bitmasks may be generated or updated in response to messages from several sources. One source of a message that may prompt a controller to alter a bitmask is the management system 210. The management system may send a bitmask itself. Alternatively, the management system may send a bitmask representing the virtual channels to be added or removed. A default operation, such as a bitwise AND, may be used to update the existing bitmask with the bitmask contained in the message. The operation to be used to update the existing bitmask may also be specified in the message. For instance, the management system may send the bitmasks seen in rows 302, 304, and/or 306, as well as instructions for whether to combine them with the existing bitmask for a terminal using an AND, OR, XOR, or other operation. Other forms that a message to update a bitmask may take include instructions to set or unset individual bits of the bitmask and/or instructions to set or unset one or more fields or series of bits of the bitmask. The individual bits and/or fields or series of bits may also be combined with an existing bitmap using bitwise operators. Still further examples of how messages requesting an update to a bitmap may be formatted include messages that identify channels to add or subtract using ASCII text, signed or unsigned binary integers, or floating point numbers.

The management system may also send a more generic message, such as an instruction to add or remove one or more content sources to the bitmask for a particular terminal or terminals, or to set the available content sources for a particular terminal to a particular combination of content sources. In these cases, the controller will identify the virtual channel or channels associated with each content source and create or modify the bitmasks for the appropriate terminals in accord with the instructions.

Instructions to add or subtract content sources from a particular terminal or terminals may come from management system 210 because service representatives may interact with management system 210. However, each of the messages described above may be received from other network components as well. For example, a terminal (such as terminal 240) may contain an interface permitting it to request changes to its own bitmask from a controller. Thus, a user of the terminal may add or subtract virtual channels from his or her channel lineup (e.g., subscription) without contacting a service representative. For example, a user may request to block certain virtual channels or allow certain virtual channels to be accessed only after entering a security code. The terminal may block the channels by sending requests to the controller to remove those channels from the bitmask. Upon a user entering a security code, the terminal may then send a request to the controller to restore the previously removed channels. Such a request may include the security code itself.

In some cases, such as the previous example, a terminal may also implement the changes to the bitmask without interacting with the controller. Instead, the terminal may create and apply the more restricted bitmask on its own. Upon entry of the security code, the terminal may then resume using the bitmask provided by the controller. Although a security code was used in this example, the bitmask may be updated upon other events as well. For example, a user may restrict access to certain channels only during a certain time period, such as certain times of day.

In the example of a terminal that may implement changes to the bitmask without interacting with the controller, it may be desirable to limit the changes that the terminal may make. For example, it may be desirable for the terminal to subtract virtual channels without consulting a controller, but to consult the controller before adding virtual channels beyond those contained in the bitmask received from the controller.

A controller may update a bitmask only temporarily. For example, a controller may grant access to a virtual channel for a limited period of time by updating a bitmask to add the virtual channel, but it may then update the bitmask again to remove the virtual channel after a certain duration or after an event occurs. For example, a user may be allowed to purchase a day pass to a virtual channel. After the day pass expires, the controller may remove the virtual channel from the bitmask associated with the terminal(s) that had the day pass. If video-on-demand or pay-per view content is associated with a virtual channel and a user elects to view the content, then the user's terminal may receive a bitmask update granting access to the virtual channel, and it may then receive a bitmask update revoking access to the virtual channel upon reaching the end of the content. This may or may not occur at a scheduled time.

Alternative sources of bitmask updates are also possible. For example, a web interface (not shown) may be provided to allow users to add or subtract services, either temporarily (in the example of parental controls) or more permanently (in the event of a change to a user's channel lineup). Messages from the web interface may be sent to management system 210. Management system 210 may then forward messages reflecting the requested changes to a controller (such as controller 220). The web interface may also send messages directly to the controller. The web interface may also be hosted on the management system or on the controller. Although bitmasks may be generated and sent to terminals on an individual basis, it may be desirable to allow updates to be applied to the bitmasks of all the terminals associated with an individual user at the same time. This may be accomplished by having the controller identify the individual terminals that are associated with any one user (e.g., user account) and having the controller update all of the corresponding bitmasks at once. In cases where the bitmask will always be the same for a group of terminals, the controller may store only a single bitmask for the group.

A user may also request changes that affect only one of the terminals associated with his account. In this case, only one bitmask needs to be updated. For example, a user may opt to add a premium channel to only one of his terminals, or a user may apply parental controls to only some of his terminals. A single virtual channel map to be used, and the bitmask for each terminal may be set to allow any combination of the channels on the map, thereby making the use of multiple virtual channels maps unnecessary for purposes of access control. However, as one of ordinary skill will appreciate, a controller may maintain multiple virtual channel maps on a single access network for other reasons. Where a controller instructs a terminal to use a different virtual channel map than it was using previously, the bitmask associated with that terminal may need to be updated to reflect differences between the old virtual channel map and the new one.

Figure 4:
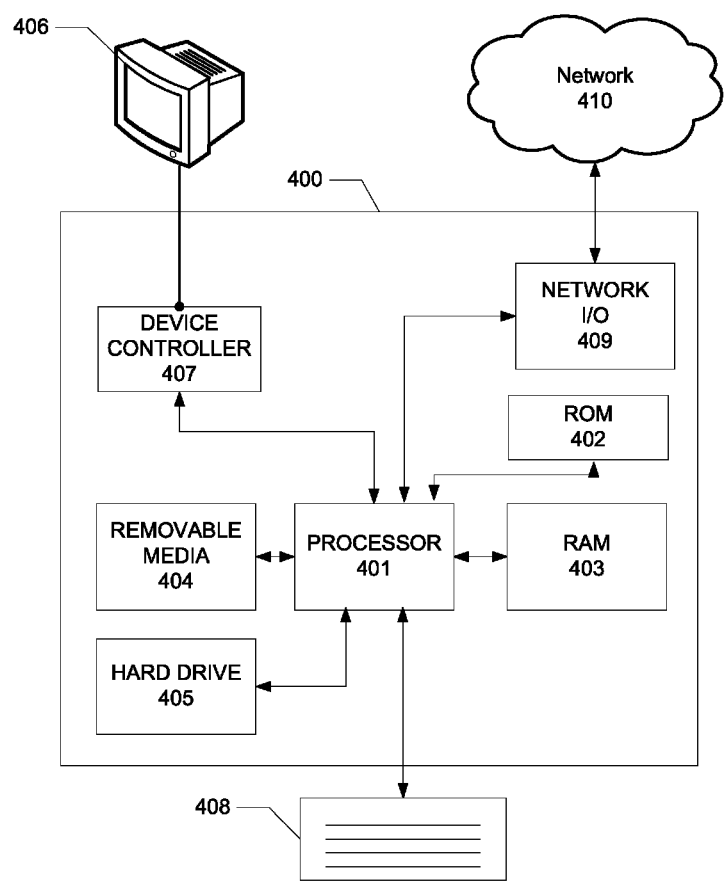
FIG. 4 illustrates an example computing platform on which the various elements described herein can be implemented.

FIG. 4 illustrates general hardware elements that can be used to implement any of the various computing devices discussed above, such as terminals 240-249, controllers 220-221, and management system 210. The computing device 400 may include one or more processors 401, which may execute instructions of a computer program to perform any of the features described herein. The instructions may be stored in any type of computer-readable medium or memory, to configure the operation of the processor 401. For example, instructions may be stored in a read-only memory (ROM) 402, random access memory (RAM) 403, removable media 404, such as a Universal Serial Bus (USB) drive, compact disk (CD) or digital versatile disk (DVD), floppy disk drive, or any other desired electronic storage medium. Instructions may also be stored in an attached (or internal) hard drive 405. The computing device 400 may include one or more output devices, such as a display 406 (or an external television), and may include one or more output device controllers 407, such as a video processor. There may also be one or more user input devices 408, such as a remote control, keyboard, mouse, touch screen, microphone, etc. The computing device 400 may also include one or more network interfaces, such as input/output circuits 409 (such as a network card) to communicate with an external network 410. The network interface may be a wired interface, wireless interface, or a combination of the two. In some embodiments, the interface 409 may include a modem (e.g., a cable modem). Network 410 may include communication lines such as optical cables, coaxial cables, Ethernet cables, satellite or other wireless links, etc. In the example of a terminal, such as terminal 240, network 410 may be an access network such as access network 230. In the example of a controller, such as controller 220, network 410 may be access network 230 or network 215, which connects controller 220 to management system 210. As in the example of controller 220, computer device 400 may connect to a plurality of networks simultaneously. Interface 209 may have dedicated hardware for each network, or some or all of the hardware may serve multiple networks simultaneously.

One or more aspects of the disclosure may be embodied in computer-usable or readable data and/or executable instructions, such as in one or more program modules, executed by one or more processors or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium, as described above. As will be appreciated by one of skill in the art, the functionality of the program modules may be combined or distributed as desired in various illustrative embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of executable instructions and computer-usable data described herein.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A method comprising:
   transmitting a mapping associating virtual channels with resources to a plurality of terminals including a first terminal; and
   transmitting to the first terminal a first bitmask having at least two bits in a sequence, the bits in the sequence corresponding to respective ones of the virtual channels to indicate whether the mapping at the first terminal should be modified to remove the corresponding virtual channels from the mapping.

2. The method of claim 1, further comprising:
   transmitting to a second terminal a second bitmask having at least two bits in a sequence, with the bits in the sequence corresponding to respective ones of the virtual channels to indicate whether the second terminal should behave as though the corresponding virtual channels are not in the mapping, and
   wherein the second bitmask contains at least one bit that is set to a different value than the corresponding bit of the first bitmask.

3. The method of claim 2, wherein transmitting each of the first and second bitmasks comprises uniquely addressing a message to a respective one of the first and second terminals, each message containing one bitmask.

4. The method of claim 1, further comprising:
   receiving a request to add one or more virtual channels to one or more terminals that include the first terminal; and
   in response to the request to add one or more virtual channels, modifying the first bitmask by combining the first bitmask and a second bitmask, wherein each bit of the second bitmask that corresponds to one of the virtual channels to be added is set to a predetermined value.

5. The method of claim 1, further comprising:
   receiving a request to remove one or more virtual channels from one or more terminals that include the first terminal; and
   in response to the request to remove one or more virtual channels, modifying the first bitmask by combining the first bitmask and a second bitmask, wherein each bit of the second bitmask that corresponds to one of the virtual channels to be removed is set to a predetermined value.

6. The method of claim 5, wherein the request to remove one or more virtual channels is received from one of the terminals in the plurality of terminals.

7. The method of claim 1, further comprising:
   receiving a request to add one or more virtual channels to one or more terminals; and
   in response to the request to add one or more virtual channels, transmitting a second bitmask to the one or more of the terminals specified in the request, wherein each bit of the second bitmask that corresponds to one of the virtual channels to be added is set to a predetermined value and each bit of the second bitmask that does not correspond to one of the virtual channels to be added is set to a value different from the predetermined value.

8. A method comprising, at a first terminal:
   receiving, a first mapping associating virtual channels to resources;
   receiving, a bitmask having at least two bits in a sequence, with the bits in the sequence corresponding to respective ones of the virtual channels; and
   for each bit in the bitmask, responsive to determining that the bit in the bitmask is set to a specific value, modifying the first mapping to remove a corresponding virtual channel from the first mapping.

9. The method of claim 8, wherein behaving as though each virtual channel for which the corresponding bit in the bitmask is set to the specific value is not in the first mapping comprises:
   creating a second mapping of virtual channels to resources by removing from the first mapping each virtual channel for which the corresponding bit in the bitmask is set to the specific value; and
   using the second mapping to identify whether a virtual channel is available.

10. The method of claim 9, further comprising using the second mapping to generate an electronic programming guide.

11. The method of claim 8, further comprising:
    receiving, at the first terminal, an update to the bitmask; and
    behaving as though each virtual channel for which the corresponding bit in the update to the bitmask is set to the specific value is not in the first mapping.

12. The method of claim 11, wherein the update to the bitmask is a message that contains a bit field that corresponds to only a portion of the bitmask, and wherein the method further comprises updating the bitmask by replacing the portion of the bitmask with the bit field.

13. The method of claim 8, further comprising:
    receiving, at the first terminal, an update to the bitmask that comprises a bit field of equal length to the bitmask;
    modifying the bitmask by combining the bitmask with the bit field using a bitwise operation; and
    in response to receiving the update, behaving as though each virtual channel for which the corresponding bit in the modified bitmask is set to the specific value is not in the first mapping.

14. The method of claim 9, further comprising:
    receiving, at the first terminal, an instruction to adjust a set of virtual channels to behave as though the channels are not in the first mapping;
    modifying the second mapping in accord with the instruction; and
    using the modified second mapping to identify whether a virtual channel is available.

15. An apparatus comprising:
    a processor; and
    a memory storing computer-executable instructions that, when executed, cause the apparatus to:
       transmit a mapping associating virtual channels with resources to a plurality of terminals including a first terminal; and
       transmit to the first terminal, a first bitmask having at least two bits in a sequence, the bits in the sequence corresponding to respective ones of the virtual channels to indicate whether the mapping at the first terminal should be modified to remove the corresponding virtual channels from the mapping.

16. The apparatus of claim 15, wherein the computer-executable instructions also cause the apparatus to transmit a second bitmask having at least two bits in a sequence to a second terminal in the plurality of terminals, with the bits in the sequence of the second bitmask corresponding to respective ones of the virtual channels to indicate whether the second terminal should behave as though the corresponding virtual channel is not in the mapping, and
    wherein the second bitmask contains at least one bit that is set to a different value than the corresponding bit of the first bitmask.

17. The apparatus of claim 15, wherein the computer-executable instructions also cause the apparatus to:
    receive a request to add one or more virtual channels to one or more terminals that include the first terminal; and in response to the request to add one or more virtual channels, modify the first bitmask by combining the first bitmask and a second bitmask, wherein each bit of the second bitmask that corresponds to one of the virtual channels to be added is set to a predetermined value.

18. The apparatus of claim 15, wherein the computer-executable instructions also cause the apparatus to:
   receive a request to remove one or more virtual channels from one or more terminals that include the first terminal; and
   in response to the request to remove one or more virtual channels, modify the first bitmask by combining the first bitmask and a second bitmask, wherein each bit of the second bitmask that corresponds to one of the virtual channels to be removed is set to a predetermined value.

19. The apparatus of claim 18, wherein the request to remove one or more virtual channels is received from one of the terminals in the plurality of terminals.

20. The apparatus of claim 15, wherein the computer-executable instructions also cause the apparatus to:
   receive a request to add one or more virtual channels to one or more terminals; and
   in response to the request to add one or more virtual channels, transmit a second bitmask to the one or more of the terminals specified in the request, wherein each bit of the second bitmask that corresponds to one of the virtual channels to be added is set to a predetermined value and each bit of the second bitmask that does not correspond to one of the virtual channels to be added is set to a value different from the predetermined value.

\* \* \* \* \*